US009086695B2

(12) United States Patent
Worek et al.

(10) Patent No.: US 9,086,695 B2
(45) Date of Patent: Jul. 21, 2015

(54) COMPACT BATCH VIEWING TECHNIQUES FOR USE IN BATCH PROCESSES

(75) Inventors: Christopher J. Worek, Austin, TX (US); Bruce Hubert Campney, Pflugerville, TX (US); William G. Irwin, Austin, TX (US); Christopher J. Felts, Austin, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 1111 days.

(21) Appl. No.: 13/102,866

(22) Filed: May 6, 2011

(65) Prior Publication Data

US 2011/0257767 A1 Oct. 20, 2011

Related U.S. Application Data

(62) Division of application No. 12/837,145, filed on Jul. 15, 2010, now Pat. No. 7,962,227, which is a division of application No. 11/531,457, filed on Sep. 13, 2006, now Pat. No. 7,793,292.

(51) Int. Cl.
*G05B 11/01* (2006.01)
*G05B 15/00* (2006.01)
(Continued)

(52) U.S. Cl.
CPC .. *G05B 19/4183* (2013.01); *G05B 2219/31288* (2013.01); *G05B 2219/31318* (2013.01); *G05B 2219/31474* (2013.01)

(58) Field of Classification Search
CPC ............ G05B 19/41865; G05B 19/41875; G05B 23/0216; G05B 2219/31265; G05B 2219/31318; G05B 2219/32077; G05B 2219/32191; G05B 2219/50197; H04L 41/14; H04L 41/142; H04L 41/22; H04L 43/045; G06F 17/30516; C06Q 10/06
USPC ................. 700/17, 83; 702/81; 709/223, 224; 715/700, 734, 736; 718/100, 101
See application file for complete search history.

(56) References Cited

U.S. PATENT DOCUMENTS

| 5,014,208 A | 5/1991 | Wolfson |
| 5,157,595 A | 10/1992 | Lovrenich |

(Continued)

FOREIGN PATENT DOCUMENTS

| CN | 1403593 A | 3/2003 |
| CN | 1573627 A | 2/2005 |

(Continued)

OTHER PUBLICATIONS

Reexamination by the Examiner before Trial filed Nov. 6, 2012.
(Continued)

*Primary Examiner* — Crystal J Barnes-Bullock
(74) *Attorney, Agent, or Firm* — Marshall, Gerstein & Borun LLP

(57) ABSTRACT

A data collection and viewing application associated with a batch process control system used within a process plant provides a user interface that allows a user to quickly and easily examine a particular batch process or a batch run, to compare separate batch runs and/or to determine whether the particular batch run deviates from a norm, without having to perform a lot of manual data manipulation. To this end, the user interface provides or creates a compact graphical representation of a batch, illustrating a number of different types of batch-related data in relation to one another in a manner that enables a user to easily view or understand the operation of the batch run, either alone or as compared with one or more other batch runs. Generally speaking, the compact batch view includes a number of graphical layers which are juxtaposed or interleaved on a display, with each of the layers providing different types of information about the operation of the batch, time synchronized with one another. A base layer of the compact batch view may describe or indicate the duration of the batch from an activate time to a deactivate time, while different aspects of the procedural elements, steps or stages of the batch process, such as those identified by the S88 standard, may be illustrated in one or more additional layers. Moreover, process alarms, alerts, events, etc. as well as other information may be placed in one or more additional layers, and the various layers may be shown together to provide a compact graphical view of the batch.

14 Claims, 6 Drawing Sheets

(51) Int. Cl.
| | | |
|---|---|---|
| G06F 19/00 | (2011.01) | |
| G06F 17/18 | (2006.01) | |
| G06F 17/40 | (2006.01) | |
| G06F 3/048 | (2013.01) | |
| G06F 9/46 | (2006.01) | |
| G05B 19/418 | (2006.01) | |

(56) References Cited

U.S. PATENT DOCUMENTS

| | | | |
|---|---|---|---|
| 5,423,199 A * | 6/1995 | Mangrulkar | 72/3 |
| 5,450,346 A | 9/1995 | Krummen et al. | |
| 5,673,194 A | 9/1997 | Cipelletti et al. | |
| 5,745,364 A | 4/1998 | Togashi et al. | |
| 5,774,875 A | 6/1998 | Medeiros et al. | |
| 5,870,696 A | 2/1999 | Randolph | |
| 5,889,674 A | 3/1999 | Burdick et al. | |
| 5,896,292 A | 4/1999 | Hosaka et al. | |
| 5,896,294 A | 4/1999 | Chow et al. | |
| 5,926,186 A | 7/1999 | Itoh et al. | |
| 5,930,137 A | 7/1999 | Togashi | |
| 5,974,457 A * | 10/1999 | Waclawsky et al. | 709/224 |
| 6,041,178 A | 3/2000 | Rybarczyk et al. | |
| 6,078,924 A | 6/2000 | Ainsbury et al. | |
| 6,243,615 B1 | 6/2001 | Neway et al. | |
| 6,289,368 B1 | 9/2001 | Dentler et al. | |
| 6,363,294 B1 | 3/2002 | Coronel et al. | |
| 6,385,494 B1 | 5/2002 | Blahnik et al. | |
| 6,438,436 B1 | 8/2002 | Hohkibara et al. | |
| 6,522,939 B1 | 2/2003 | Strauch et al. | |
| 6,584,501 B1 | 6/2003 | Cartsonis et al. | |
| 6,836,894 B1 | 12/2004 | Hellerstein et al. | |
| 6,931,442 B1 * | 8/2005 | Hamanaka | 709/224 |
| 6,938,262 B2 | 8/2005 | Bao et al. | |
| 7,020,876 B1 | 3/2006 | Deitz et al. | |
| 7,249,356 B1 | 7/2007 | Wilson et al. | |
| 7,672,964 B1 * | 3/2010 | Yan et al. | 707/999.102 |
| 7,730,043 B1 * | 6/2010 | Bourdev | 707/695 |
| 7,894,918 B2 * | 2/2011 | Kanodia et al. | 700/17 |
| 2004/0254658 A1 | 12/2004 | Sherriff et al. | |
| 2005/0228708 A1 | 10/2005 | Catala et al. | |

FOREIGN PATENT DOCUMENTS

| | | |
|---|---|---|
| EP | 0 434 050 | 6/1991 |
| EP | 0 487 419 A2 | 5/1992 |
| EP | 0 745 916 | 12/1996 |
| EP | 0 825 506 | 2/1998 |
| EP | 1884850 A1 | 2/2008 |
| GB | 2 353 616 | 2/2001 |
| JP | 7-114601 A1 | 5/1995 |
| JP | 07-334769 A | 12/1995 |
| JP | 08-126835 A | 5/1996 |
| JP | 8-328608 A1 | 12/1996 |
| JP | 10-228312 A1 | 11/1998 |
| JP | 11-134154 A | 5/1999 |
| WO | WO-03/023687 A2 | 3/2003 |
| WO | WO-2007/017738 A2 | 2/2007 |

OTHER PUBLICATIONS

Office Action for related Chinese Application No. 200710145319.3 mailed on Jul. 13, 2011.
Examination Report for Application No. GB0717766.0, dated Sep. 22, 2011.
Examination Report for Great Britain Application No. 1106716.2, dated May 31, 2011.
Examination Report for Great Britain Application No. 0717766.0, dated May 27, 2011.
Author unknown, "NT-Based Recipe Provides Graphical Editor and Simplified Integration," Control Magazine, 146-147 (1997).
Author unknown, "SP88 Reduces Batch Variation," Online Posting: http://www.controlmagazine.com/0897/c0740897.html.
Johnson, "Distributed Control: A View of What's New," Online Posting, Control Engineering Online (1996) http://www.manufacturing.net/magazine/ce/archives/1996/09/issues/na/09a700.html.
Kourti et al., "Process Analysis, Monitoring and Diagnosis, Using Multivariate Projection Method," *Chemometrics and Intelligent laboratory Systems*, 38:3-21 (1995).
Nomikos, "Detection and Diagnosis of Abnormal Batch Operations Based on Multi-Way Principal Component Analysis," *ISA Transactions*, 35:259-266 (1996).
Nomikos, "Multi-Way Partial Least Squares in Monitoring Batch processes," *Chemometrics and intelligent Laboratory Systems*, 30:97-108 (1996).
Piper, "Distributed Control Systems Spread Out," Online Posting: http://www.controlmagazine.com/0697/c0370697.html.
Rosenof, "Data Logging and Reporting for Effective Batch Control," *The Industrial and Process Control Magazine*, 58(8):29-32 (1985).
Simensen et al., "A Framework for Batch Plant Information Models," Petri Netw Newsletter (1996).
Search Report from the United Kingdom Intellectual Property Office for corresponding Great Britain patent application No. GB0717766.0, dated Dec. 12, 2007.
Examination Report for Great Britain Application No. 0717766.0, dated Oct. 19, 2010.
Notice of Reasons for Rejection for Japanese Application No. 2007-238594, dated Mar. 27, 2012.
Office Action for Chinese Application No. 200710145319.3 mailed on Aug. 25, 2010.
Chinese Office Action issued in Application No. 201310067216.5 issued on Oct. 23, 2014.

* cited by examiner

COMPACT BATCH VIEWING TECHNIQUES FOR USE IN BATCH PROCESSES

RELATED APPLICATIONS

This application is a divisional application of, and claims the benefit of priority to, U.S. patent application Ser. No. 12/837,145, filed Jul. 15, 2010, now U.S. Pat. No. 7,962,227, and entitled "COMPACT BATCH VIEWING TECHNIQUES FOR USE IN BATCH PROCESSES," and U.S. patent application Ser. No. 11/531,457, filed Sep. 13, 2006, now U.S. Pat. No. 7,793,292, and entitled "COMPACT BATCH VIEWING TECHNIQUES FOR USE IN BATCH PROCESSES," both of which are hereby incorporated by reference herein, in their entirety, for all purposes.

FIELD OF TECHNOLOGY

The present invention relates generally to process control networks and, more particularly, to a batch display engine that obtains and displays information regarding batch processes implemented within a process plant.

DESCRIPTION OF THE RELATED ART

Process control networks, such as those used in chemical, petroleum or other processes, generally include a centralized process controller communicatively coupled to one or more field devices which may be, for example, valve positioners, switches, sensors (such as temperature, pressure and flow rate sensors), etc. These field devices may perform physical control functions within the process plant (such as opening or closing a valve), may take measurements within the process plant for use in controlling the operation of the process plant or may perform any other desired function within the process plant. Process controllers have historically been connected to field devices via one or more analog signal lines or buses which may carry, for example, 4-20 mA (milliamp) signals to and from the field devices. In the past couple of decades or so, however, the process control industry has developed a number of standard, open, digital or combined digital and analog communication protocols such as the FOUNDATION™ FIELDBUS (hereinafter "Fieldbus"), HART®, PROFIBUS®, WORLDFIP®, Device-Net® and CAN protocols which can be used to implement communications between a controller and field devices. Generally speaking, the process controller receives signals indicative of measurements made by one or more field devices and/or other information pertaining to the field devices, uses this information to implement a typically complex control routine and generates control signals which are sent via the signal lines or buses to the field devices to thereby control the operation of the process plant.

Certain types of process control networks, such as those used in batch processes, typically include multiple sets of replicated equipment, with each set of equipment being designed to have the same or similar hardware which performs essentially the same function within the process plant. Thus, for example, a cookie manufacturing plant may have multiple sets of mixing equipment, multiple sets of baking equipment, and multiple sets of packaging equipment, with some or all of the individual mixers being capable of operating in parallel and of being connected to operate in series with some or all of the baking equipment and the packaging equipment. In such a system, it is typical to use the same general control algorithm or routine to control the operation of any particular set of replicated equipment to make the same product (as defined by a specific batch recipe). Typically, each such batch control procedure performs a number of different steps or stages in sequence, finishing the first stage before beginning the second stage and so on. Thus, in the cookie manufacturing plant described above, the batch control procedure runs a first procedure or step to control the mixing equipment, then runs a procedure to run the baking equipment on the product made by the mixing equipment and then runs a third procedure that controls the packaging equipment to package the product produced by the baking equipment, each step of which takes a finite amount of time.

Thus, generally speaking, batch processes involve subjecting raw materials to processing steps using one or more pieces of equipment to produce a "batch" of product.

Preparation of polyvinyl chloride is an example of a batch process practiced on an industrial scale wherein polyvinyl chloride is made by polymerizing or joining together much smaller molecules of vinyl chloride. This process is accomplished by filling a batch reactor to the appropriate level with a mixture of vinyl chloride, solvent and polymerization inducer, heating the mixture in the reactor, cooling the resulting batch, and purifying the batch by removing leftover starting materials. The production of polyvinyl chloride is but one example of batch process, and in general, there are many different kinds of batch processes including those used in product manufacturing, distribution, and testing as well as batch processes related to non-product uses.

One batch control standard that has been promulgated by the International Society for Measurement and Control, an international organization concerned with issues of process control, is entitled *Batch Control Part 1: Models and Terminology* and is often referred to as the ISA S88.01-1995 standard, or one of its updates (referred to herein as the "S88 standard"). The S88 standard defines models of equipments and procedures for use in automated batch processes, and defines certain terminology for use in referring to those models and their elements. For example, the S88 standard defines a "batch process" as a process that leads to the production of finite quantities of material by subjecting quantities of input materials to an ordered set of processing activities over a finite period of time using one or more pieces of equipment. As another example, a "batch" is defined by the S88 standard as the material that is being produced or has been produced by a single execution of a batch process.

Batch processing equipment (e.g., controllable elements such as valves, heaters, mixers, etc.) is operated during a batch process or a batch run according to pre-defined procedures to make a batch. All such batch processing equipment is referred to synonymously herein as equipment, equipment modules, processing equipment, and/or physical elements. The procedures to operate such physical elements are often referred to by the S88 standard as the "procedural model." According to the S88 standard, the procedural model is structured as a hierarchical ranking of procedures, with the highest level encompassing each of the lower levels, the next highest level encompassing each of the levels below it, and so on. The levels of the S88 procedural model of particular interest include, in descending order, "procedures," "unit procedures," "operations," and "phases." The terms "procedural element" or batch sub-procedures are used herein to refer to any embodiment or implementation of any of these levels of the S88 procedural model as well as to any other hierarchical definition of a set of batch procedures.

As indicated above, the highest-level S88 procedural element of interest is referred to as a procedure, which is made up of one or more unit procedures. Each unit procedure is or can be in turn made up of one or more operations, which are each in turn made up of one or more phases. Moreover, the S88 procedural model does not preclude the definition and use of other hierarchical levels in particular applications. Rather, the S88 standard and the procedural elements referred to herein are intended to provide a broad, standardized model for describing the procedures followed in automated batch-process control, and these elements are not limited to the four procedural elements defined by the S88 standard.

The different procedural elements of a batch are generally implemented in practice as computer programs that are executed by and within data-processing devices, including personal computers, workstations, and programmable controllers. Execution of a typical procedural element results in an electrical or optical output from the data-processing device that can be used to control a physical element, typically by connecting an output of the data-processing device to the physical element directly, or indirectly over a local-area or wide-area network. A procedural element performs an assigned or associated task by invoking "basic control" with respect to at least one physical element. This type of control is typically dedicated to establishing and maintaining a specific desired state of the physical element. Basic control would include, for example, starting or maintaining a flow of material in a storage bin element, heating the starting materials in a polyvinyl chloride reactor element, etc. In practice, the lower levels of the procedural model (namely phases) perform the actual communications with the actual physical elements, thereby invoking or performing basic control. The higher levels of the procedural model are essentially abstractions to improve the organization and the structure of the procedural model, as well as the physical model.

Moreover, many batch systems use a state machine model as a logical construct to describe the state of a batch process or activity. The state machine model describes or defines a number of process states, together with actions that cause transitions between those states. A state machine model of a process is said to be in a particular state due to an earlier transition into that state. When a particular event occurs or a particular status is sensed, the state machine model makes a transition to another state corresponding to the particular event or sensed status. State machine models are useful techniques for defining and implementing the operation of a procedural element of a batch process. In particular, a procedural element defined and implemented as a state machine initiates an action, for example, when its associated state machine makes a transition from an old state to a new state.

Of course, the S88 standard permits the definition and implementation of procedural elements in accordance with a standard state machine model. While the S88 standard does not mandate this approach, this approach has been broadly adopted in the process control industry to enable a higher degree of interoperability among the products of various vendors. One present commercial application of the S88 standard having procedural elements defined and implemented according to a state machine model is the DeltaV™ Batch product from Emerson Process Management. In DeltaV™ Batch, a server program or a batch executive program runs on the data processing device that executes the various procedural elements. The server or batch executive program coordinates execution of procedural elements in accordance with one or more state machine models so that procedures, corresponding unit procedures, corresponding operations, and corresponding phases are sequenced through their respective steps by the server program. Moreover, a batch campaign program may be used in conjunction with a user interface to set up a set of various batch processes or batch run to be run in a plant using the plant equipment. In any event, during the implementation of a particular batch run or a particular batch process, such as when a phase is initiated by the server program, the phase communicates the initiation request to the phase logic interface within a programmable controller. The programmable controller then executes the actual state logic or control routine for the phase and provides the required process control via communications to the process equipment.

As will be understood, it is desirable to gather data representative of the historical events that make up the processing of a batch run. Such historical data may be useful, for example, in determining trends in quality control or for determining when equipment used in the batch process is in need of service. A number of types of data are potentially useful in reviewing the quality or progress of a batch process. One such source of data is continuous data generated by the various data points in the batch process during the processing of the batch. A data point is a single source of such continuous data that reflects some control value or other status or measurement of the batch process. For example, a particular level of a material flow or a temperature as measured by a sensor might be one such data point. A present setting of a control valve, the time at which a sample was taken, etc. may be other data points. Each such data point may have a continuous stream of data values sensed or controlled over time by the batch process application associated therewith. The aggregation of all such continuous data, generated during processing of a batch, is often logged by a batch processing system. These log records usually include a timestamp and a present value along with other identifying information for the data point such as a tag to identify the source of the data.

Another type of data useful in reviewing the quality or progress of a batch process is event information, which relates to or includes information that describes the batch process in terms of execution of the procedural model. For example, batch events that describe the start and end time of a particular phase or a particular operation, unit procedure or procedure of the procedural model constitute event information. Event information also includes process events, including information generated by the physical elements of the batch process or by an operator. In particular each equipment module, cell, etc. of a process may generate process events that indicate one or more specific activities in the starting, stopping or running of a particular phase (i.e., performing specific basic control actions). Alarm and event conditions recognized by the process equipment are further examples of process events. Process events may also include information regarding operator changes to the batch process made during operation of the batch process.

It is most useful to integrate these various forms of event information and continuous data to provide a comprehensive, understandable presentation of such information to a user of the batch process. However, many presently available tools for reporting on batch process quality and progress fall far short of such integration. A user is generally required to perform the integration manually using a variety of disjoint tools. Further, to the limited extent present solutions provide such integration, a user is required to provide significant, detailed configuration information to permit the reporting programs to correlate the various types and sources of event information and continuous data. For example, many present tools used in batch processing gather continuous data from the batch process while other tools provide the user with a cumbersome interface to locate particular sections of interesting data. For example, a user may use an indexing tool to define a filter or trigger that locates captured data relating to a particular event or procedure in the batch process. The filter or trigger may be, for example, as simple as defining a start and end time for data relating to execution of a particular phase. In some instances, the definition may be more complex, requiring the user to identify other parameters that identify data corresponding to a particular procedural element.

In general, with these tools, the user must manually provide configuration information to define events of interest in the batch process. The access of and configuration of this information often entails a complex task for the user, requiring significant user knowledge of the events of interest and the likely characteristics of data relevant to those events of interest. Furthermore, regardless of the complexity of defining the filter for associating data with a procedural event, the process of defining such filters to associate data with batch events is a largely manual process. Essentially, using these tools, the user must enter configuration data that identifies a particular event and particular portions of continuous data associated with that event. Such manual processes are prone to error such that the relationships between event information and related continuous data may be incorrectly established. Furthermore, these tools require that the user be knowledgeable about the structure of the stored data and makes the user responsible for generating meaningful relationships among the data for their presentation. Though the query capabilities of the existing techniques may be significant, these techniques generally provide little more than a relational database "front-end" for accessing data. Such relational database management system query operations still require a user to understand the relationships among the various elements of stored data and to create therefrom meaningful queries for presentation of desired data.

Another problem with many present batch processing tools arises in the presentation of process and batch event information to a user. A batch historian program is one system that gathers and presents batch event information related to a batch processing system to a user. However, present batch historian programs generally produce tabular, textual reports from the continuous data or, at best, produce simple linear graphs of trends in elements of the continuous data. Present batch historian features of batch processing systems therefore provide limited flexibility in presentation of data to a user. For example, the relationships among batch events or process events and continuous data is difficult to discern from the tabular, textual presentations of present historian programs.

U.S. patent application Ser. No. 09/302,687, which was filed on Apr. 29, 1999 and which published as UK Patent No. GB 2,353,616, entitled "Methods and Structure for Batch Processing Event History Processing and Viewing," the disclosure of which is hereby expressly incorporated herein by reference, discloses a batch viewing system which makes it easier for a user to view continuous batch data in relation to the various batch procedural elements or events. In particular, this patent describes a view client process that permits a user significant flexibility in viewing event information and relationships among the various events of a batch as derived by a batch history executive. Generally speaking, the view client displays the event information in a graphical manner using Gantt chart displays to represent batches and related procedural hierarchical events. The graphical user interface also allows a user to select an event so displayed to "drill down" and view lower levels of the hierarchical events that make up the selected event. A textual, tabular format presentation of hierarchically lower events that comprise the selected event are also displayed in a textual tabular format below the graphical Gantt chart presentation. This batch view enables the user to graphically view continuous data for logged data points in a manner that relates the continuous data to associated event information. However, even in this case, the view of the batch is presented in a Gantt chart, which can make it hard to understand or view an entire batch process in a manner this is useful or meaningful to a user.

Thus, as will be understood, to view the ongoing operation of a batch, it is not possible to take a simple snapshot of the batch process at any particular time and display that data to a user, as the batch process has various different procedural elements, which may be run on different equipment within the plant at different times, using different setpoints, settings, etc. Instead, to view a batch run, the user must review and analyze data from the batch at various different times related to the procedural events of the batch (i.e., the sub-procedures and sub-processes associated with the batch) to thereby be able to understand the operation of the batch run. While various batch data is typically automatically collected and stored during operating of the batch run, different types of data are generally collected by different subsystems and, in fact, may be stored in different databases. This fact makes it difficult for the operator to have a comprehensive view of any particular batch process. For example, data such as alarm data and sensor measurement data which is obtained from actual field devices such as sensors, valves, etc. within the batch process are typically stored in a data historian as time-stamped data and are available from the data historian generally based on the time at which the data was collected. However, a different database, such as one associated with the a batch executive routine, may store the start and end times of a batch run and the various different sub-procedures or procedural elements within the batch run.

Nonetheless, it can be important, and in some cases critical, that a user or an operator be able to easily view the operation of a batch in a compact manner, e.g., in a manner that does not require the user to scroll through and view massive amounts of raw data collected during the operation of the batch. In many cases, it is desirable to quickly and easily examine a batch to determine whether a given batch deviates from a noun such as that defined by a "golden batch." Currently, the solution to this problem requires that the user monitor data related to certain process variables collected during a batch run and graph those batch parameters against a norm to understand whether the batch process is actually performing according to normal procedure or whether the batch process has deviated in a manner that makes the output of the batch inferior or is operating in a manner indicating that the batch process is no longer functioning correctly.

SUMMARY

A data collection and viewing application within a process control system for a process plant provides a user interface that allows a user to quickly and easily examine a particular batch process or a batch run, compare separate batch runs and/or determine whether the particular batch run deviates from a norm, without having to perform a lot of manual data manipulation. In particular, the user interface provides or creates a compact graphical representation of a batch, illustrating a number of different types of batch-related data in relation to one another in a manner that enables a user to easily view or understand the operation of the batch run, either alone or as compared with one or more other batch runs.

Generally speaking, the compact batch view includes a number of graphical layers which are juxtaposed or interleaved on a display, with each of the layers providing different types of information about the operation of the batch, time synchronized with one another. If desired, abuse layer of the compact batch view may describe or indicate the duration of the batch from the start or activate time to the end or deactivate time, while different aspects of the procedural elements, steps or stages of the batch process, such as those identified by the S88 standard, may be illustrated in one or more additional layers. Moreover, alarms, alerts, events, etc. as well as other information may be placed in one or more additional layers, and the various layers may be shown together to provide a compact graphical view of the batch.

If desired, the compact graphical view may include a batch signature for a particular type of batch process or a particular batch recipe. Such a batch signature could be developed as a mathematical or statistical representation of a number of different batch runs, showing, for example, the average or expected start and/or end times of the various procedural elements, statistical times associated with various events, alarms, etc. that occur during the batch run, etc. If desired, the batch signature may be developed using one or more statistical measures of data from actual batch runs, from modeled batch runs or both.

DETAILED DESCRIPTION

Figure 1:
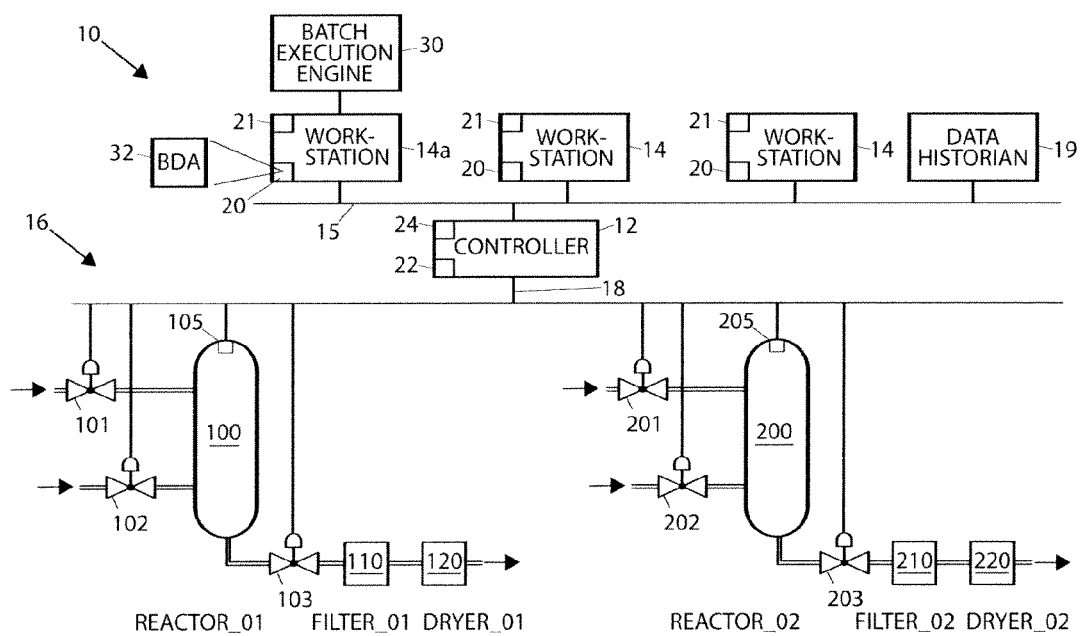
FIG. 1 is a partial block diagram, partial schematic diagram of a portion of a process control network including a batch data collection and viewing application that may be used to create and display a compact batch view.

Referring now to FIG. 1, a process plant control network 10 includes a process controller 12 coupled to numerous workstations 14 via, for example, a local area network (LAN) 15, which may in one example be an Ethernet communications connection. The controller 12 is also coupled to devices or equipment within a process plant (generally designated by the reference numeral 16) via one or more input/output (I/O) devices (not shown) and a set of communication lines and/or a bus 18. The controller 12, which may be by way of example only, the DeltaV™ Batch controller sold by Emerson Process Management, is capable of communicating with control elements, such as field devices and function blocks within field devices distributed throughout the process plant 16 to perform one or more process control routines to thereby implement desired control of the process plant 16. These process control routines may be continuous process control routines but will be described herein as batch process control routines or procedures. The workstations 14 (which may be, for example, personal computers, servers, etc.) may be used by one or more engineers or operators or other users to design and execute one or more process control routines to be executed by the controller 12, to communicate with the controller 12 so as to download such process control routines, to receive and display information pertaining to the process plant 16 during operation of the process plant 16 and to otherwise interact with the process control routines executed by, for example, the controller 12. Additionally, a data historian 19 may be connected to the LAN 15 and may automatically collect and store data generated within the plant 16, including within the controller 12, the filed devices and even the workstations 14, in any known or desired manner.

Each of the workstations 14 includes a memory 20 for storing applications, such as configuration design applications, and for storing data, such as configuration data pertaining to the configuration of the process plant 16. Each of the workstations 14 also includes a processor 21 that executes one or more applications which may, among other things, enable a user to design process control routines such as batch control routines and to download those process control routines to the controller 12. Likewise, the controller 12 includes a memory 22 for storing configuration data and process control routines to be used to control the process plant 16 and includes a processor 24 that executes the process control routines to implement a process control strategy. If the controller 12 is a DeltaV Batch controller, it, in conjunction with one or more applications on one of the workstations 14, may provide a graphical depiction of the process control routines within the controller 12 to a user illustrating the control elements within the process control routine and the manner in which these control elements are configured to provide control of the process plant 16.

In the example process plant control network 10 illustrated in FIG. 1, the controller 12 is communicatively connected via the bus 18 to two sets of similarly configured equipment, each set of equipment having a reactor unit referred to herein as Reactor_01 (R1) or Reactor_02 (R2), a filter unit referred to herein as Filter_01 (F1) or Filter_02 (F2) and a dryer unit referred to herein as Dryer_01 (D1) or Dryer_02 (D2). Reactor_01 includes a reactor vessel 100, two input valves 101 and 102 connected so as to control fluid inlet lines providing fluid from, for example, a headtank (not shown) into the reactor vessel 100 and an output valve 103 connected so as to control fluid flow out of the reactor vessel 100 via an outlet fluid line. A device 105, which can be a sensor, such as a temperature sensor, a pressure sensor, a fluid level meter etc. or some other equipment such as an electrical heater or a steam heater, is disposed in or near the reactor vessel 100. The Reactor_01 is coupled via the valve 103 to the Filter_01 having filter equipment 110 which, in turn is coupled to the Dryer_01 having dryer equipment 120. Similarly, the second set of equipment includes the Reactor_02 which has a reactor vessel 200, two input valves 201 and 202, an output valve 203 and a device 205. The Reactor_02 is coupled to the Filter_02 having filter equipment 210 which, in turn, is coupled to the Dryer_02 which has dryer equipment 220. The filter equipment 110 and 210 and the dryer equipment 120 and 220 may have additional control elements (such as heaters, conveyor belts and the like), sensors, etc. associated therewith. If desired, although not shown, each of the filter units Filter_01 and Filter_02 may be physically coupled to each of the reactor units Reactor_01 and Reactor_02 while each of the dryer units Dryer_01 and Dryer_02 may be coupled to each of the filter units Filter_01 and Filter_02 so that a batch run using one of each of a reactor, a filter and a dryer may use any combination of the equipment illustrated in FIG. 1.

As illustrated in FIG. 1, the controller 12 is communicatively coupled to the valves 101-103, 201-203, to the devices 105, 205, to the filters 110, 210 and to the dryers 120 and 220 (and to the other equipment associated therewith) via the bus 18 to control the operation of these elements (which may be units, field devices, etc.) to perform one or more operations with respect to these elements. Such operations may include, for example, filling the reactor vessels, or dryers, heating the material within the reactor vessels or dryers, dumping the reactor vessels or dryers, cleaning the reactor vessels or dryers, operating the filters, etc. Of course, the controller 12 could be coupled to the elements within the process plant 16 via additional busses, via dedicated communication lines, such as 4-20 ma lines, HART communication lines, etc.

The valves, sensors and other equipment illustrated in FIG. 1 may be any desired kind or type of equipment including, for example, Fieldbus field devices, standard 4-20 ma field devices, HART field devices, etc. and may communicate with the controller 12 using any known or desired communication protocol such as the Fieldbus protocol, the HART protocol, the 4-20 ma analog protocol, etc. Still further, other types of devices may be connected to and be controlled by the controller 12 in any desired manner. Also, other controllers may be connected to the controller 12 and to the workstations 14 via, for example, the Ethernet communication line 15 to control other devices or areas associated with the process plant 16 and the operation of such additional controllers may be coordinated with the operation of the controller 12 illustrated in FIG. 1 in any desired or known manner.

Generally speaking, the process control system of FIG. 1 may be used to implement batch processes in which, for example, one of the workstations 14 executes a batch execution application that implements and possibly coordinates different batch runs within the process plant 16. Such a batch execution engine 30 is illustrated as being stored in the workstation 14a of FIG. 1, it being understood that the batch execution engine 30 could be stored in and executed in other workstations 14, or in other computers communicatively connected to the bus 15 or to the bus 18 in any desired manner, including in any wireless manner. Likewise, if desired, the batch execution engine 30 may be divided into various components or be associated with various components stored in and executed in different computers or workstations within the process plant 16.

The batch execution engine 30 is generally a high level control routine and may include what is commonly referred to as a batch campaign manager that enables a user to specify a number of batch runs to be performed within the process plant and that sets up a number of different batch runs or batch processes to operate essentially independently within the process plant control network 10. The batch execution engine 30 may also include batch executive routines or applications, that implement and oversee the different batch runs specified by the campaign manager. Each such batch run directs the operation of one or more procedures, unit procedures, operations, phases and other sub-divisions of a batch, each of which are or may be sub-routines or processes that operate on a single unit, such as one of the reactor units, the filter units, the dryer units, or other equipment within the process plant 16. In this example, each unit procedure (which is a part of a batch run that is generally run on one of the workstations 14) may perform a series of operations, each of which may perform one or more phases on a physical unit. For this discussion, the terms phases, operations, unit procedures and procedures are meant to refer to these procedural elements defined by the S88 standard and thus, a phase is the lowest level action or step performed on a unit and is typically implemented or executed in one of the controllers 12, an operation is a set of phases that performs a particular function on the unit and is typically implemented or executed on one of the workstations 14 by calling a series of phases within the controller 12, and a unit procedure is a series of one or more operations performed on a single unit and is typically implemented as a set of operation calls on one of the workstations 14. Likewise, a procedure is a set of unit procedures which may be performed on, for example, different physical units within the process plant 16. As a result, any procedure can include one or more unit procedures, and any unit procedure can include one or more phases and/or one or more operations. In this manner, each batch process performs different steps or stages (e.g., unit procedures) needed to produce a product, such as a food product, a drug, etc.

To implement different procedures, unit procedures, operations and phases for an individual batch, a batch process uses what is commonly referred to as a recipe which specifies the steps to be performed, the amounts and times associated with the steps and the order of the steps. Steps for one recipe might include, for example, filling a reactor vessel with the appropriate materials or ingredients, mixing the materials within the reactor vessel, heating the materials within the reactor vessel to a certain temperature for a certain amount of time, emptying the reactor vessel and then cleaning the reactor vessel to prepare for the next batch, running a filter to filter the output of a reactor and then running a dryer to dry the product created in the reactor vessel. Each of the series of steps associated with a different unit defines a unit procedure of the batch and the batch process will execute a different control algorithm for each one of these unit procedures. Of course, the specific materials, amounts of materials, heating temperatures and times, etc. may be different for different recipes and, consequently, these parameters may change from batch run to batch run depending on the product being manufactured or produced and the recipe being used.

As will be understood by those skilled in the art, the same phases, operations, unit procedures and procedures of a generic batch process can be implemented on each of the different reactor units of FIG. 1 at the same or at different times as part of different actual batch processes or batch runs. Furthermore, because the reactor units of FIG. 1 generally include the same number of and types of equipment (i.e., they belong to the same unit class), the same generic phase control routine for a particular phase may be used to control each of the different reactor units, except that this generic phase control routine has to be modified to control the different hardware or equipment associated with the different reactor units. For example, to implement a fill phase for Reactor_01 (wherein the reactor unit is filled), a fill control routine will open one or more of the input valves 101 or 102 for a certain amount of time, for example, until the fluid level meter 105 senses that the vessel 100 is full. However, this same control routine may be used to implement a fill phase for Reactor_02 by merely changing the designation of the input valve(s) to be the valves 201 or 202 instead of the valves 101 or 102 and by changing the designation of the fluid level meter to be the fluid level meter 205 instead of the fluid level meter 105. Of course, the logic associated with the general operation of batch runs is known and will not be further described herein.

Referring again to FIG. 1, one or more of the workstations 14 may also store and implement a batch display application (BDA) 32 which interfaces with one or more of the controller 12, the data historian 19 and the batch execution engine 30 to collect batch data and to produce a display for a user on a display device, such as a computer screen, a printer, etc. illustrating the operation of one or more batch runs in a compact and easy to understand manner. While only the workstation 14a of FIG. 1 is illustrated as including a BDA 32, other ones of the workstations 14 as well as other computers connected to the LAN 15 or one of the workstations 14 thereof could store and implement a BDA 32. Likewise, the computers that implement the BDAs 32 could be connected to the process control system 10 via a hardwired connection or a wireless connection (or a combination of both) and could include devices such as laptops, hand held devices like personal data assistants, cell phones, etc. or any other portable or non-portable computer device. Those skilled in the art will understand that, while batch displays are described herein for batches using reactor units, filter units and dryer units such as those illustrated in FIG. 1, display routines may be used illustrate the operation of other desired devices to perform any other desired batch process runs.

Figure 2:
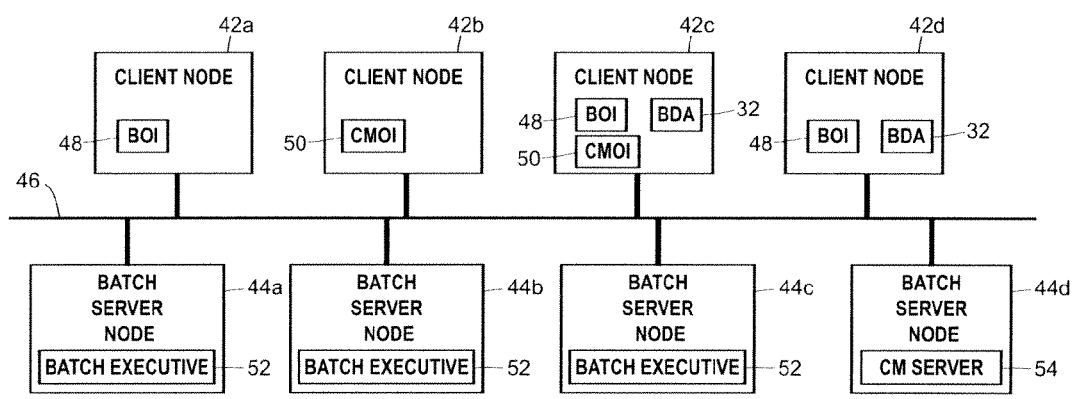
FIG. 2 is a block diagram of a network of computers including a batch executive application used to implement multiple batches within a process plant.

FIG. 2 is a block diagram of a known client/server network 40 which may be used in a process control system to implement multiple batch executive engines and if desired, multiple BDAs 32. In particular, the network 40 includes a set of client computers or nodes 42 and a set of server computers or nodes 44 connected via a bus or other communication network 46 that may be used to enable and implement one or more batch executive routines and/or batch display applications within a process plant. Generally, the batch network architecture of FIG. 2 takes the form of a classic two-tier, client/server based design in which the client nodes 42 provide commands or messages to the server nodes 44 which then execute actual batches within a process plant (not shown in FIG. 2). The client nodes 42 generally include one or more operator interface applications which enable a user to set up and configure multiple batch runs within a process plant using any desired strategy applicable to the plant and which enable one or more users to view batch data related to the batches run within the plant. In the diagram of FIG. 2, three of the client nodes 42a, 42c and 42d are illustrated as including a batch operator interface (BOI) application 48, which is a routine that interfaces with an operator to enable an operator to set up and specify an individual batch to be run, i.e., to initiate one or more batch runs. Similarly, the client nodes 42b and 42c are illustrated as including a campaign manager operator interface (CMOI) application 50 which enables a user to set up a campaign of batch runs (generally including multiple sequential batch runs) to be run or executed in a particular order or at particular times in the future within the process plant. One such campaign manager application is described in detail in U.S. Pat. No. 7,020,876, entitled "Campaign Management for Batch Processes," which issued on Mar. 28, 2006, the disclosure of which is hereby expressly incorporated by reference herein. It will be understood that other BOI and CMOI applications are known and may be used as well. Moreover, two of the client nodes 42c and 42d are illustrated as including batch display applications (BDAs) 32 which may provide compact batch views associated with one or more batch processes run within the process plant either during operation of the batch run or after the batch run. If desired, however, the BDAs may be implemented as part of one of the BOIs 48 and/or the CMOIs 50, or as part of any other user display application.

Generally, each of the server nodes 44a, 44b, and 44c is a batch server having a known batch executive routine or application 52 which establishes bi-directional communication with one or more of the BOI applications 48 and/or the BDA applications 32 within the nodes 42a, 42c and 42d, and which implements and oversees one or more separate batches within the process plant at the same time. In a similar manner, the client node 44d includes a campaign manager server application 54 which establishes bi-directional communication with the CMOI applications 50 and/or the BDA applications 32 and implements the batch campaigns created using the CMOI applications 50 by interfacing or communicating with the batch executive applications 52 (using batch initiation request) within the batch server nodes 44a, 44b and 44c. The client/server architecture of FIG. 2 is traditionally used to isolate the client applications from the server applications to provide greater fault tolerance.

As illustrated for the batch executive application 52 in the batch server node 44b, the batch executive application 52 responds to batch initiation requests sent by the campaign manager server 54 and the BOI applications 48 to implement one or more batch runs within the process plant 16. It will be understood that the batch server 44b is communicatively connected to one or more controllers 12 which, in turn, are communicatively connected to one or more devices, units, etc. within the process plant as, for example, illustrated in FIG. 1.

Figure 3:
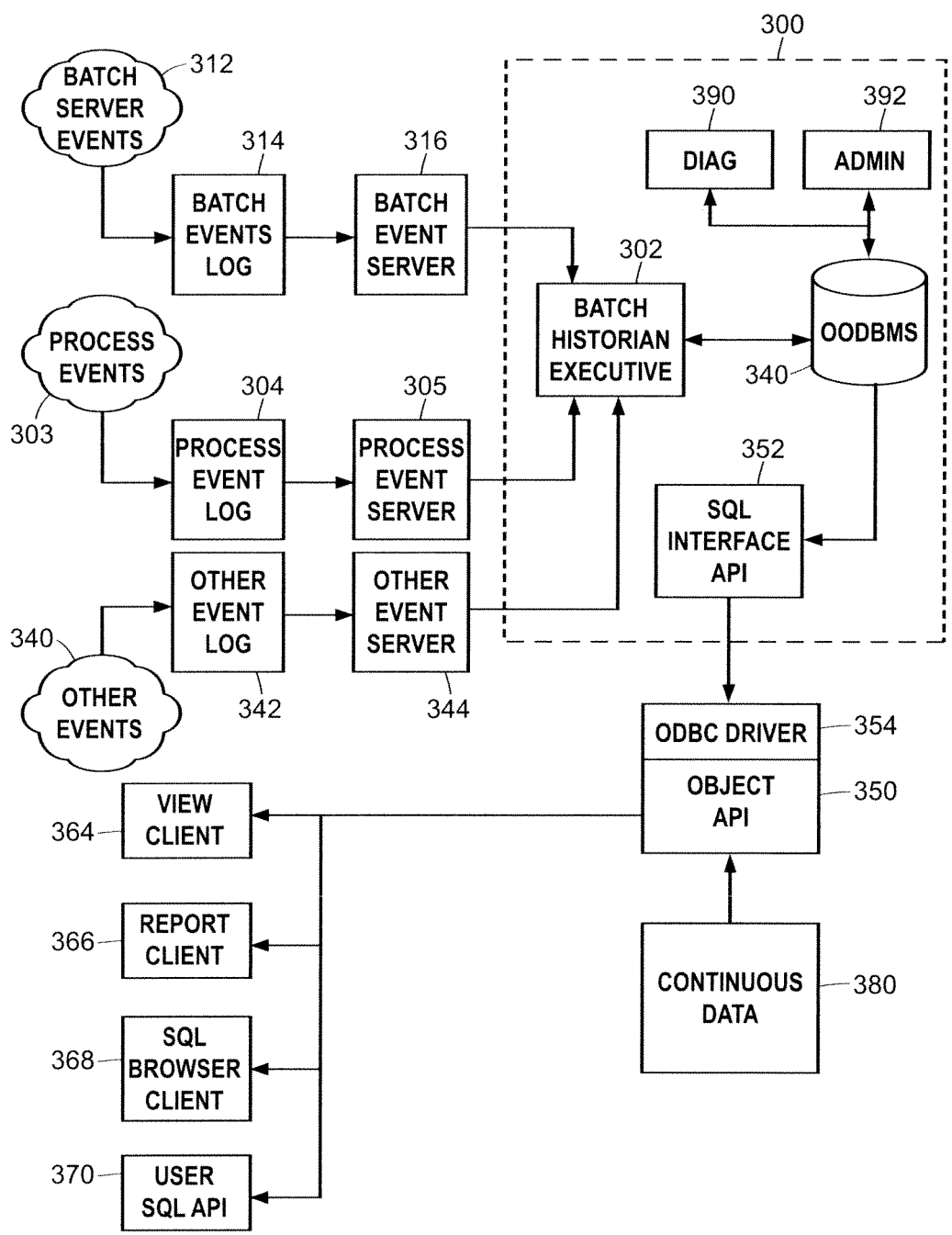
FIG. 3 is a block diagram depicting a batch history logging and reporting system including a batch event historian for use in creating and displaying a compact batch view.

FIG. 3 will now be described to illustrate a manner in which batch data from one or more batch runs can be collected and stored and then provided to the BDAs 32 for use in creating a compact batch display. In particular, FIG. 3 illustrates a batch event historian 300 for collecting, storing and retrieving event information regarding one or more batch runs of one or more batch processes so as to automate the collection of the data needed for creating one or more compact batch views from the various sources at which this data is detected or generated. In particular, the batch event historian 300 includes a batch historian executive 302 that receives event information from multiple data sources and determines relationships among the various elements of gathered event data. Still more specifically, the executive 302 receives process events 303 from a process event log 304 and a process event server 305. As will be understood, process events are generated by physical equipment and/or operator interaction with the batch (not shown) and may generally be stored in the data historian 19 of FIG. 1. The process event log 304 may represent a buffer (i.e., an inter-process communication FIFO or pipe) for buffering such events to be processed by process event server 305. The executive 302 also receives batch server events (also referred to as procedural events) 312 via batch events log 314 and one or more batch event servers 316. Generally, batch server events 312 are generated by a batch server process (not shown) which performs the batch process and may be developed for example, by one of the controllers 12 or one of the batch executive engines 30 or 52 or campaign manager applications 50, 54 of FIGS. 1 and 2. The batch events log 314 may therefore represent a buffer (i.e., inter-process communication FIFO or pipe) for buffering such events to be processed by batch event server 316.

The process event server 305 and batch event server 316 may be present to provide a common inter-process communication interface between the executive 302 and its associated data sources which generate the batch events and the process events within the logs 314 and 304. Those skilled in the art will recognize however, that there are many equivalent software structures to permit the executive 302 to gather data from a variety of data sources having potentially different data formats. The embodiment shown in FIG. 3 is intended therefore as exemplary of one such design choice to enable a single common interface between the executive 302 and a variety of data sources. Further, those skilled in the art will recognize that any number of data sources may be integrated by executive 302 so as to determine event relationships between the events generated by these various data sources. If desired, each data source may be associated with a server process to translate the data source into a canonical format and to provide such canonical data to the executive 302 via well known inter-process communication techniques.

In fact, if desired, an arbitrary number of data sources may be connected to the batch historian executive 302. To illustrate this concept, an other events block 340 is shown in FIG. 3 and represents such an other type of event to be recorded in a persistent store, with these other types of events generally being related to the batch processing hierarchy (e.g., procedural elements) and/or to the physical elements of the process. A log 342 of such other events serves to buffer the generation of such events for processing. An other event server 344 may then process the logged other events and provide them to the executive 302 for persistent storage. Those skilled in the art will recognize that any number of such data source may be attached to the executive 302 and that each such data source may be associated with a server process that converts the logged event information into the canonical format specified for input to the executive 302.

The executive 302 reconstructs the batch process procedural hierarchy of executed procedural events from event messages received from the batch server 312. The batch history executive 302 may generate a message when each procedural element is executed on behalf of a particular identified batch and the event information in such messages may include identification information to identify the particular procedural element and the time of the event. Events include, for example, the starting, stopping, pausing, aborting, etc. of the procedural element. Essentially, the state transitions of the procedural model of the S88 standard may cause the generation of an event information message and transmission of the message (via batch event server 316) to the executive 302. Other event messages may be related to the procedural hierarchy reconstructed by the executive 302.

The executive 302 may store objects in the database 340 reflecting the reconstructed batch process procedural execution and if desired may create a compact batch view for a batch run. The executive 302 may inspect all such gathered event information from its attached data sources and determine whether the batch events referenced therein are already known to the executive 302. Such events are known to the executive essentially when these events are found to be previously stored as objects in the database 340. Where new batch events are detected, appropriate descriptive objects may be generated and stored in the database 340. Where, for example, a phase is started, an object for that phase including identification information and timestamp information is generated and stored. If the phase relates to an operation that is already known in the database 340, those relationships are established. If the operation (or unit operation or procedure) is not presently known, then other objects may be generated and stored in the database 340 to reflect these higher levels of the procedural hierarchy execution. Receipt of each batch event message via the batch event server 316 therefore provides event information that permits the executive 302 to reconstruct the batch procedure execution.

The executive 302 may also store process events 303, received via the process event log 304 and the process event server 305, in the database 340. Relationships between the batch events and the process events may thereby automatically be created and retained without need for manual user configuration.

Moreover, an object API 350 provides an object oriented programming interface for user access to the event information and derived relationships stored in the database 340 as well as to any compact batch views stored in the database 340.

In one embodiment, the batch event historian 300 provides a Structured Query Language (SQL) interface 352 for external access to the information stored in database 340. The object API 350 therefore accesses the database 340 via an Open Database Connectivity (ODBC) driver 354 and the SQL interface 352. This structure makes the underlying persistent store largely transparent to the user or the application client programs. The persistent store may be implemented as depicted in FIG. 3 using OODBMS technology. However, in view of the hidden underlying structure, the persistent store may be implemented using standard relational model database management packages or any other structured storage subsystem database. For purposes of further discussion herein, the database 340 is referred to synonymously as persistent store, persistent storage, object store and other variants thereof to stress that the storage architecture may be structured in any well known manners using any commercially available storage management tools.

Exemplary user applications 364 through 370 may access the information in the persistent storage using the object API 350. The view client 364 is an exemplary user application that provides a standardized hierarchical view of the acquired historical data and may be used to provide a compact batch view as described herein. The report client 366 is an exemplary user application that produces standardized reports from the historical data. Such standard reports may include, for example, quality assurance related reports to monitor quality of the batches produced and the equipment used in the batch process or standard status reports indicating the progress of particular batch processes. The SQL browser client 368 is an exemplary user application that provides an SQL standard query interface for a user to browse information stored in the persistent storage. Similarly, the user SQL API 370 is an exemplary user application that permits other user generated application processes to access the persistent storage using standard query programming interfaces. Those skilled in the art will recognize that exemplary user applications 364 through 370 are intended merely as examples of common application programs that may utilize data in the persistent storage. Those skilled in the art will recognize a variety of similar applications that could utilize this standard interface to the data in the persistent storage.

A further function of the object API 350 is to provide a standard interface for user access to continuous data 380. The object API 350 permits the user or application to access continuous data 380 transparently as though this continuous data 380 is integrated and related with the objects in database 340. In other words, the object API 350 permits a user or an application to freely intermix and access process events, related batch events and related continuous data as though all of this data were stored in a single database, and thus enables the creation of a compact batch view which uses some or all of these different types of data. Directing access of the user to the proper persistent store (e.g., the database 340 or the continuous data 380) and determining all relations necessary to associate the data with a request may be handled with a common user interface by the object API 350. A user may specify a particular batch event and access therefor all related batch events (hierarchically related procedural elements), all related process events and all related continuous data, etc. The relationships among the various data may be automatically determined by the executive 302 and/or the object API 350.

A diagnostic interface 390 and an administrative interface 392 provide administrative user interfaces for managing the persistent store (e.g., the database 340). In particular, requests which startup or shutdown the historian processing or which reconfigure the persistent store (i.e., resize the database 340 or add/remove/modify information about data sources) may be generated by a user through the diagnostic interface 390 and/or the administrative interface 392. Moreover, the administrative interface 392 may also control the archival features of the executive 302. For example, the executive 302 may controllably perforin batch based backups, which are backups that back up all event information in the persistent store related to processing of a particular batch. The backup may be created in another section of the database 340 and may be save for other processing. These backup sections of the persistent store may be "detached" from the database 340 for offline processing. Essentially the administrative interface 392 instructs the executive 302 to make a "snapshot" of all event information for one or more identified batches. The snapshot may then be copied to a safe backup using offline processing techniques. Such an archived (snapshot) set of event information may then be deleted from the persistent store to make room for further batch history information. At a later time, an earlier archive may be restored (re-attached) to the database 340 to permit the data to be viewed and manipulated again. Deletion and restoration of such archived information is also performed by control of the administrative interface 392 that, in turn, controls the executive 302.

Those skilled in the art will recognize that the diagnostic interface 390 and the administrative interface 392 are not needed for the operation of the batch event historian 300 illustrated in FIG. 3 and that a variety of different or equivalent structures may be employed as a matter of design choice by those skilled in the art for each of the elements described in FIG. 3. For example, the batch event historian 300 may statically configure the persistent storage and/or may run without a user interface to start and stop its operation. Moreover, those skilled in the art will recognize that the architecture of batch event historian 300 and the related object API 350 is intended to be exemplary in nature only, and numerous variations of the architecture will occur to those skilled in the art. For example, continuous data 380 could be merged within the database 340 where existing installed systems (commonly referred to as legacy systems) are not involved in providing persistent storage logging of such information. Moreover, the persistent store for event information may be other than an object oriented data store, or the batch historian executive 302 may directly access the various input sources that provide event information rather than relying on server processes to translate the input to canonical formats. Of course, many other design choices will be apparent to those skilled in the art.

While, in the past, data has been collected for each of the batch runs of a batch process or recipe established by the campaign managers 50, 54 and/or implemented by the batch executives 30, 48, 52 of FIGS. 1 and 2, the viewing of this data has not been as easy or useful as might be desired. In fact, when the batch data is typically presented to the user, the user generally has to view the raw data collected from individual equipment within each particular batch, which is tedious, time consuming and is not very fruitful when trying to view the current operation of a batch. Additionally, if the user is looking for significant events such as start and stop times of particular procedures, unit procedures, operations, or phases within a batch and/or whether certain alarms or events have occurred during these procedural elements, or other timing issues associated with individual batch runs, the user has to view a massive amount of data or has to search through different databases or different sections of a database to view these different types of data. While U.S. patent application Ser. No. 09/302,687 describes a system which allows the user to view a Gantt chart to view different start and stop times of the procedures, unit procedures, operations and phases of batch runs, the user must still access other data, such as continuous data and alarm data by the clicking on the Gantt chart and viewing further screens. Furthermore, depending upon the nature of the Gantt chart and the length of the batch run or the batch process generally, the Gantt chart display can take up a significant amount of display space and may have numerous procedural elements located vertically with respect to one another, thereby making this view somewhat difficult to use.

To reduce or alleviate these issues, the batch display applications 32 may operate as one of the view clients 364 of FIG. 3, and may access batch data to create or display one or more compact batch views for a batch run of a batch process and/or one or more statistically based batch signatures for a batch process. To create the compact batch views and batch signatures, the BDAs 32 may include a communication routine that communicates with a data historian, other database or other devices within the process plant to obtain batch data associated with batch events and process events for one or more batch runs of the batch process, a data processing routine which may process this data to determine various statistical measures associated with the batch data, and a display or user interface routine that presents the obtained and/or processed data to a user on a display, such as a display screen associated with a computer, a personal data assistant, a wireless phone or other handheld device.

Figure 4:
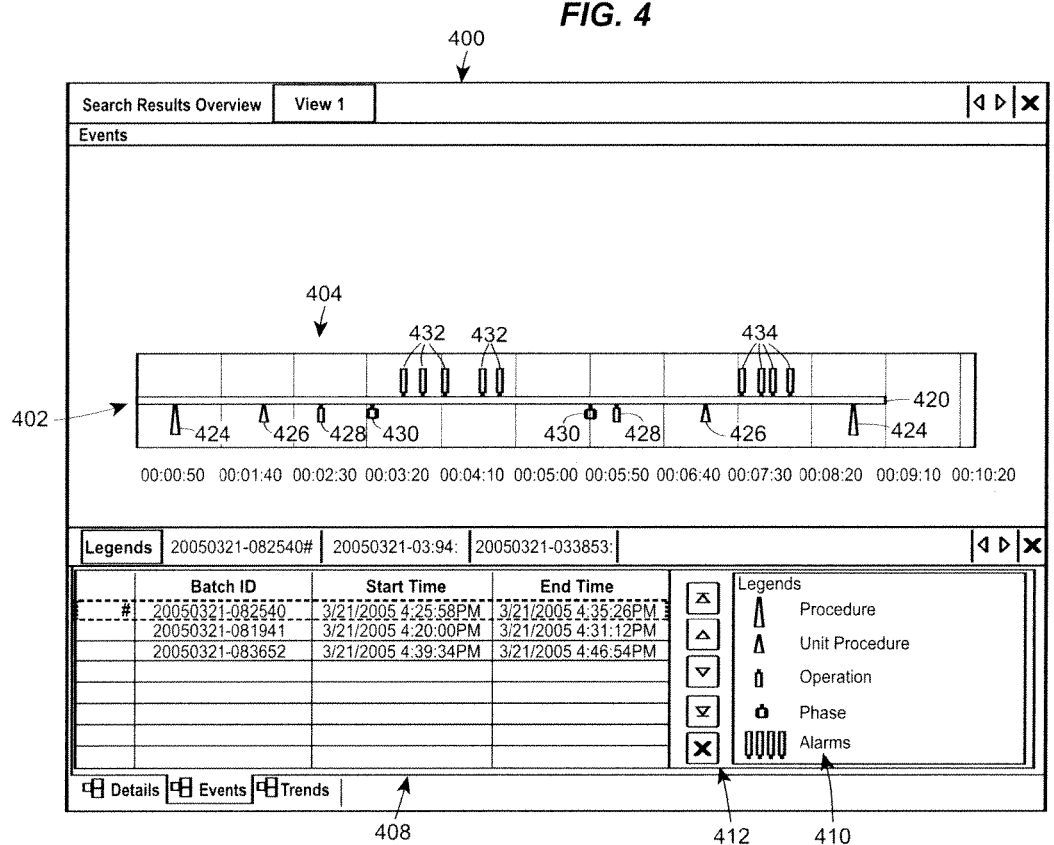
FIG. 4 is a first exemplary screen display generated by the batch data collection and viewing application of FIG. 1, illustrating an example compact batch view for a particular batch process.

An example of a compact batch view which may be determined by the BDAs 32 is illustrated in the display screen 400 of FIG. 4. Generally speaking, the display screen 400 of FIG. 4 includes a compact batch view section 402 which illustrates, in this example, a single compact batch view 404 for a particular batch run. The display screen 400 also includes a batch list section 408 which includes a list of batches or compact batch views which may be selected and viewed in the view section 402. Likewise, the display screen 400 includes a legend section 410 that provides a list of legends or icons used in the compact batch view 402 and a set of user actuatable or selectable buttons 412 that may be used to scroll through or go to different compact batch views, as identified in the batch list section 408, or to delete one or more of these compact batch views. As will be understood, the legends or icons shown in the section 410 (as well as in the compact batch view 404) of FIG. 4 may differ in shape, size, color, etc. and identify some aspect, such as a start or end time, of different types of batch events such as batch procedures, unit procedures, operations, phases and/or of process events such as alarms, all of which are illustrated in the compact view 404. However, the legends section 410 may include other types of legends including legends or icons for other types of process events, process alarms, batch procedure events, etc. including events, alarms, procedures and operations or other indications of batch sub-procedures defined in other manners than using the S88 standard.

As will be seen, the compact batch view 404 is displayed in the view section 402 for the batch as highlighted or selected within the batch list section 408. As also illustrated in FIG. 4, the compact batch view 404 includes a base layer 420 showing the start and end times, and the entire duration (as defined by the time scale 422) of a particular batch run. In the case of the compact batch view 404 of FIG. 4, the time scale 422 is shown as time relative to the beginning of the batch run. Alternatively, however, the time scale 422 could be relative to other times associated with the batch run or could indicate real time, showing the actual start and end times (including if desired the days, years, etc.) of the batch run as well as various actual times associated with this batch run. Of course, other time scales could be used, including time scales relative to other batch runs or process events, time scales relative to other events within a particular batch run (instead of the start of the batch run), etc.

Moreover, various other layers may be added to the base layer 420 to produce the compact batch view for a batch run. In particular, a further layer 423 is illustrated below the base layer 420 of FIG. 4 and shows, using predefined icons or legends, the start and end times of various different batch procedural elements, such as the beginning and end times of the one or more procedures, unit procedures, operations and phases associated with the batch run. As it will be understood, unit procedures are typically sub-procedures of a procedure, operations are typically sub-procedures of unit procedures and phases are typically sub-procedures associated with operations. Thus, in the compact batch view 404 of FIG. 4, a particular procedure for this batch is illustrated by start and end time legends 424 of a first type, a unit procedure associated with the procedure is illustrated by the start and end time legends 426 of a second type, an operation associated with the unit procedure is illustrated by the start and end time legends 428 of a third type and a phase for that operation is illustrated by the start and end time legends 430 of a fourth type. Still further, the icons or legends of one batch procedure element (i.e., icons of one type) may be disposed in the same data layer (e.g., on the same horizontal line or level) and between the icons or legends of a second batch procedure element (i.e., icons of a second type) to make the identification or viewing of the data associated with these different hierarchical procedure elements easy to understand or view. Of course, many batch procedures will have numerous or multiple sub-elements, such as multiple unit procedures, operations and phases, many batch unit procedures will have multiple operations and phases and many batch operations will have multiple phases. While such examples are not shown in FIG. 4, in those cases, the resulting compact batch view would have multiple start and end time legends for the multiple phases, multiple operations, multiple unit procedures and multiple procedures within the layer 423.

Still further, a third layer 431 illustrated above the base layer 420 includes indications or icons of other events including for example, process events or batch events, which occurred during the batch run. These icons are illustrated as being of a different type than the icons used to illustrate the batch procedure elements in the layer 423. One example of such events includes process alarms and process alerts generated during the batch run. In the example compact batch view 404 of FIG. 4, a group of five alarms 432 are illustrated as occurring during the phase marked with legends 430 while another set of four alarms 434 are illustrated as occurring after the end of the unit procedure marked with the legends 426 but before the end of the procedure marked with the legends 424. Of course, while procedures, unit procedures, operations, phases and alarms and other events are shown in the compact batch view 404 of FIG. 4, other types of information and events such as times at which test samples were taken from the batch, times at which significant events occurred within the batch, etc. may be illustrated in the batch compact view at the time when these events occurred. These other events may include, for example, when a critical temperature or pressure was reached, indications of equipment utilization (for example, it may be important to see how long a particular piece of equipment or resource, such as one of the reactors R1, is in use by the batch, such as when this resource is "acquired" and "released" by the batch to determine if this resource is a bottleneck in production), etc. Still further, different types of data may be placed in different layers of the compact batch view to ease understanding of the compact batch view. Thus, for example, batch data such as batch procedure element data can be placed in one layer while process data, such as alarms and events, can be placed in another layer. In the example above, resource utilization may be implemented as a layer in the compact batch view. Moreover, any desired number of layers may be used or shown in the compact batch view. Thus, for example, external events (e.g. alarms where a process variable exceeds some limit) can constitute a layer which can be added to the base display, environmental conditions, such as weather related data may be shown in a layer may be shown in another layer, equipment utilization may be implemented as another layer, etc.

If desired, viewing of the data or legends illustrated in the compact batch view 404 may be enhanced by the use of color, visual effects such as blinking, video displays, graphics, etc. For example, legends associated with different types of batch procedure elements, such as phases and operations, or icons associated with the starting and stopping of the same batch procedural element, may be shown using different colors and/or visual effects. Likewise, the severity or importance of alarms or events may be shown using different colors while the quality of a product produced or results of a test may be shown using some combination of color and graphics. Still further, the user may be able to obtain further information on the meaning of legends or the data behind legends shown on the compact view 404 by hovering the mouse or cursor above the associated legends. If desired, further information may be obtained by clicking on or selecting a legend, with this information generally being more complete or raw data collected and used to create the legend on the compact batch view. Likewise, if desired, the various information to be shown in any particular layer or the number and types of layers to be shown in any particular compact batch view may be user selectable or changeable to thereby enable the user to configure the compact batch view in a manner that best suits that particular user's needs. Moreover, if desired, several compact views could be shown parallel to each other on a display screen with the time scale being vertically oriented instead of horizontally oriented as illustrated in FIG. 3. Such a display may be useful when, for example, there is too much information in the layers of the compact views to easily view multiple compact views at the same time.

As will be understood, and as shown in FIG. 4, it is desirable for the batch display application 32 to use discrete icons (i.e., icons associated with a single point in time) to illustrate information or events within the compact batch view, including different icons associated with different parts of process events and batch procedure elements (such as the starting or stopping of a batch procedure element or some other event within a batch procedure element), as the use of discrete icons enables more information to be placed into a single layer of the compact batch view, thereby making the compact batch view more compact and easier to understand. In particular, using discrete icons of different types for different events within the compact batch view, enables batch data or events associated with, for example, multiple different batch procedure elements to be shown in the same data layer within the compact batch view and to still be distinguished from one another based on the different types (size, shape, color, etc.) of icons used to represent these data or events.

Of course, the information used in creating the compact batch view may be obtained from the data historians, from the controllers or the batch executive routines or even from the campaign management routines of FIGS. 1-2 directly based on actual starting and end times of each of the various batch sub-procedures and the times at which the alarms and other information are actually generated, and/or this information may be obtained using the system of FIG. 3. Moreover, the BDA 32 creating or displaying a particular compact batch view may access data stored within the appropriate data historian or may collect data from the batch executives or the controllers being controlled by the batch executives in order to collect the appropriate batch data and to create a compact batch. In one embodiment, the BDAs 32, upon being executed, may obtain and process the batch data stored within various sections of the data historian or other databases to obtain the information needed to create a compact view as defined by the user. Thereafter, these compact batch views may be stored as separate views or as data pertaining to separate batch runs, and be able to be recalled and viewed by the same or different BDA 32 at later times. Thus, the BDAs 32 may operate to create compact batch views on demand and/or may automatically create these batch views during ongoing operation of the batch runs and may store these views in a separate database to be recalled at a later time for any desired purpose.

Figure 5:
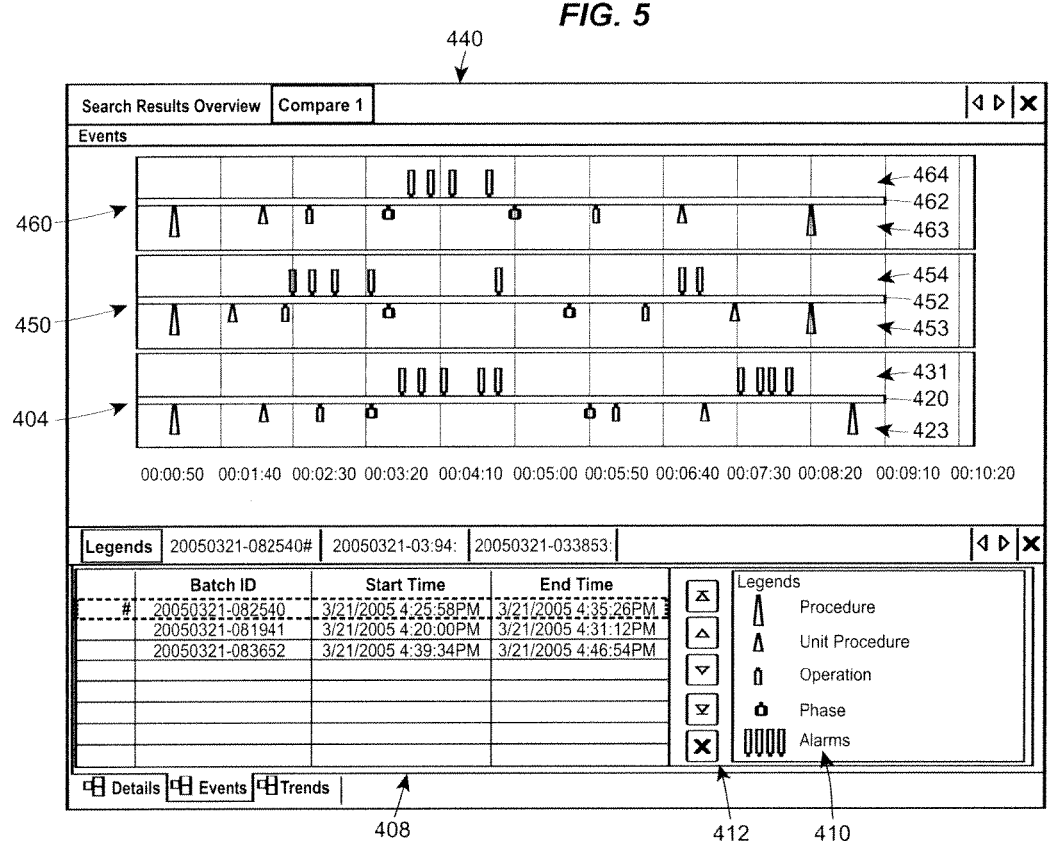
FIG. 5 is a second exemplary screen display generated by the batch data collection and viewing application of FIG. 1 illustrating a screen that enables a comparison of multiple compact batch views associated with different batch runs of a batch process.

The compact batch view 404 or any other compact batch view may be used to quickly identify or visualize the significant events associated with the batch, or may be view by an operator or other user to see the ongoing operation of a batch for the purpose of understanding the operation of a batch and/or to compare different batch runs to one another in an easy and useful manner. Thus, for example, the display screen 440 of FIG. 5 illustrates a set of three compact views including the compact batch view 404 of FIG. 4 as well as additional compact views 450 and 460. The compact batch views 450 and 460 may be created and displayed, for example, for the batches associated with additional ones of the batch IDs illustrated in the compact batch list section 408. Generally speaking, in this case, the compact batch views 404, 450 and 460 illustrate batch runs of a batch using the same recipe, and run on either the same or different equipment at either the same or different times. As can be seen from compact batch views 404, 450 and 460 of FIG. 5, each batch run took the same amount of time to execute or complete, as indicated by the base layers 420, 452 and 462 of these compact batch views. Still further, while each of the associated batches included the same batch procedural elements (i.e., one procedure, with one unit procedure, with one operation with one phase), the relative start and end times of these batch procedural elements varied between the batch runs as indicated by the layers 423, 453 and 463 below the base layers 420, 452 and 462. Still further, as indicated by the upper layers 431, 454 and 464, different alarms and events occurred at different times in each of these batch runs. Moreover, while the batch runs illustrated in the batch identification section 408 started and ended at different actual times, these batch runs are aligned in the compact view section 402 according to relative times measured from the start time of each of the batch runs.

Generally speaking, the simultaneous viewing of multiple compact batch views in the same display, as illustrated in FIG. 5, allows users such as operators or engineers or maintenance personnel to easily compare different batch runs that implement the same (or different) batch processes (e.g., batch recipes) when run on either the same or different equipment. This simultaneous batch viewing thus enables a user to view and determine trends, to view the current operation of the batch run, to view differences in batch runs which might have resulted in or have been responsible for differences in the quality or quantity produced by a particular batch run, etc.

Still further, to enable a user to perform a better comparison of a particular batch run and other batch runs that used the same recipe, equipment, etc., the BDA 32 may create and illustrate a batch signature for a particular batch recipe or batch process, as developed by a number of runs of the batch recipe or batch process. Generally, a batch signature may be created as a statistical norm or a measure of an expected batch run based on a number of previous batch runs that were implemented using the same or similar batch recipe, raw materials, equipment, processing techniques, etc. As a batch signature may be a statistically determined norm for a batch run using a particular set of equipment, recipe, etc., any subsequent batch run may be compared to this norm either after completion of the batch run or during the batch run to view or indicate whether the batch run is within the norm as defined by the batch signature or meets certain criteria associated with the normal operation of the batch process. For example, a user may compare a compact batch view in relation to the batch signature for the appropriate batch process to quantify the variation of the particular batch run from the normal operation of the batch process.

Figure 6:
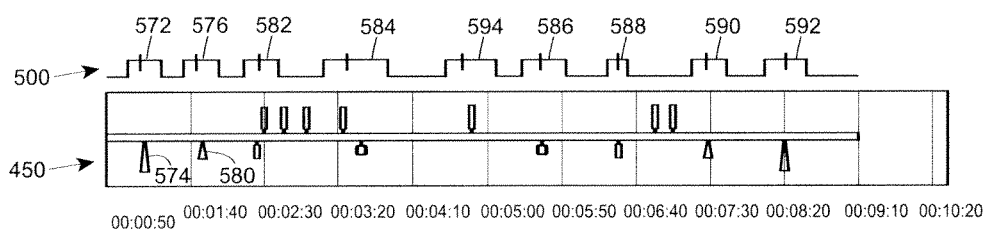
FIG. 6 is an exemplary screen display generated by the batch data collection and viewing application of FIG. 1 illustrating a statistical batch signature generated from batch data collected from multiple batch runs of a batch process.

As an example, FIG. 6 illustrates the compact batch view 450 of FIG. 5 displayed below a statistical signature 500 created for the batch process of which the compact batch view 450 and the compact batch view 460 and 404 are members. In particular, the batch signature 500 may include a graph that illustrates the statistical times associated with the expected starting and stopping times of each of the procedures, unit procedures, operations and phases of the batch run. Each of these expected times is illustrated as a pulse in the graph 500, with the center of the pulse (or some other marker such as a line or a dot in the pulse) representing the average or median start time associated with a particular batch event (such as the start of a particular procedure) and the edges of the pulse representing some statistical measure of normal or expected deviation from the average or median or otherwise expected start time. Such a statistical deviation may be, for example, a first, second or third standard deviation from the average or median start time. Alternatively, the expected deviation can be determined as the greatest deviation from the average or median time found in any of the batch runs used to create the statistical signature. Of course, such expected deviations could be determined in any other desired manner. For example, simple math could be used to determine a start of a pulse associated with a phase of a batch process as the first occurrence of the phase start relative to the batch start in a sample set of batches (i.e., the set of batch runs used to create the batch signature) and to determine an end of a pulse for that phase as the last occurrence of the phase end relative to the batch start in the sample set of batches.

Of course, the average, median, and/or deviations for each start and end time associated with a batch procedural event, a process event or any other batch event may be determined statistically based on several or multiple batch runs of the process. Thus, the statistical signature 500 may include a pulse 572 which is associated with the start of the unit procedure 574 in the compact batch view 450, and may include another pulse 576 associated with the start of the unit procedure 580. In a similar manner, pulses 582, 584, 586, 588, 590 and 592 may be associated with a start or an end of an indication of one of the other procedures, unit procedures, operations and phases of the batch run identified by or shown within the compact batch view 450. Of course, the batch signature 500 could include pulses or other indicia indicating the expected or statistically based times for other events, such for process events, like alarms, sample times, test times, utilization, etc. In FIG. 6, for example, a pulse 594 is shown as a signature for one of the alarms in the upper layer of the compact batch view 450. Still further, while the batch signature 500 of FIG. 6 is illustrated as using pulses, other indicia or indications may be used to display statistical data for a batch run. Of course, all of the statistical measures or data provided in the batch signature 500 may be displayed relative to the start time of the batch or may be displayed relative to the start time of some sub-procedure in the batch, if so desired, so as to enable a user to compare a particular batch run as defined or illustrated in a particular compact batch view to a number of other batch runs (represented by the statistical batch signature). This batch signature thus enables a user to compare or view the conformance of a particular batch run to other batch runs in a statistical manner.

If desired, a different batch signature layer could be created for each of the layers of a compact batch view and the various layers of the batch signature could be combined or displayed relative to one another (such as above or below one another) in either the same or a different manner as those layers are displayed in the compact batch views. In this manner, the various different layers or elements of a compact batch view may be compared to the same elements of the batch signature. Of course, because the signature pattern of a batch process is graphical in nature, this signature lends itself to acting as a layer in a batch view or to being superimposed on a given batch view to enable a user to determine any deviation. If desired, a BDA 32 may automatically determine batch deviation from a signature norm algorithmically at runtime and may, for example, set an alarm or an alert when any significant deviation occurs (wherein a user or an operator may be able to define the amount of deviation that will result in an alarm or alert being set for a particular deviation). Of course, the BDAs 32 may also or instead automatically graphically indicate deviations, for example, by highlighting the screen to show where a batch as illustrated in a particular compact view deviates from the norm defined by an associated batch signature. Moreover, because the batch now has a graphical nature, the BDA 32 may also create a display that displays only the deviations of a particular batch run from the appropriate batch signature.

While each batch signature may be illustrated as being generated from a set of stored batches, the batch signature may be generated live or while the batch is running based on a predetermined number of other batches, including other batches which are currently running and, if desired, including batch data from the batch for which the signature is being shown. Thus, the stored batches from which the batch signature may be calculated may include batch data from currently running batches, and the batch signature may be generated on the fly or on-line when a batch is running.

Moreover, to enable a better comparison of different batch views, the BDA 32 may enable a user to implement a concept referred to herein as time folding on one or more compact batch views and/or batch signatures, to thereby allow a user to view only particular, and non-contiguous, sections of a compact batch view or a batch signature. Generally speaking, time folding may be described as omitting one or more specific time periods of the batch run, and can be thought of as drawing a compact batch view on paper, and then folding the paper to show different non-contiguous portions of the compact batch view concatenated together.

This time folding feature is helpful in viewing the most important or interesting parts a batch run, as many compact batch views may be very long, especially when the associated batch runs have multiple procedures, unit procedures, operations and/or phases associated therewith. Still further, some of the sections or sub-procedures of a batch run displayed in a compact batch view may not be of high importance or relevance to a user, while other sections or portions may be of great importance in, for example, determining whether the batch run is executing properly. In these instances, a user may want to eliminate or remove the sections of the compact batch view (and/or the associated batch signature) which are less important, to thereby highlight the more important sections of the compact batch view (and/or the associated batch signature).

Figure 7:
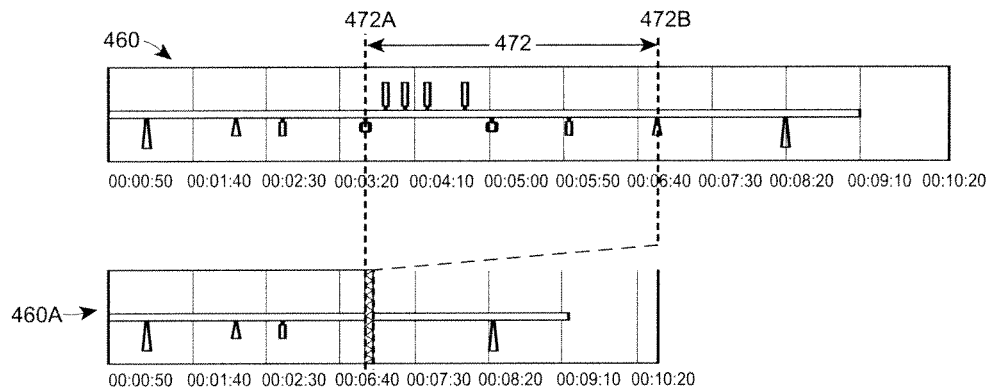
FIG. 7 is an exemplary screen display generated by the batch data collection and viewing application of FIG. 1 illustrating the use of time folding in the compact batch view.

To perform this time folding function, the BDA 32 may provide the user with the ability to specify the sections of the compact view to be folded out or removed. FIG. 7 illustrates the compact batch view 460 of FIG. 5 in the upper-most portion showing all of the sections of the compact batch view 460, and a folded compact batch view 460A which is the same as the compact batch view 460 except that all of the sections of the compact batch view 460 from the beginning of the phase (shown by the dotted line 472A) to the end of the unit procedure (shown by the dotted line 472B) folded out or removed. In this manner, various non-contiguous sections of the compact batch view may be concatenated together. More particularly, in this example, the time folding performed by the BDA 32 creates a compact batch view such that the section 472 between the dotted lines 472A and 472B is removed by overlaying the dotted line 472A and the line 472B, resulting in the folded compact batch view 460A.

Of course, a compact batch view may have multiple time folded segments and the time folded segments may be folded out of a particular compact batch view in any desired location to allow the user to view, in a continuous nature, the relevant or interesting portions of a batch run and to display the same portions of different batch runs on a single display screen. Thus, in one example, the same sections of various different compact batch views, such as the compact batch views of FIG. 5, may be time folded to eliminate data from various different sections of various batch runs associated with the same batch process, to enable a user to view or compare the same times within different batch runs of a batch process, etc. Of course, the user may want to eliminate differences in various compact batch views which result from non-interesting events such as waiting for acquiring process equipment on which to run the batches, other waiting periods associated with cleaning equipment, periods in which the batch is "held" in process (for example, a batch is waiting for an operator to respond to a prompt), etc. as well as to allow the executing batch to synch up with the batch signature pattern or with other compact batch views for other batch runs, etc. Another use of time folding is, for example, to allow a user to "align" two or more compact batch views so that, for example, the start points of a particular operation, phase, procedure, unit procedure, alarm, etc. of the batch runs are lined up. In this case, the operation, phase, etc. and later operations can be compared side by side or on top of one another without worrying about earlier parts of the batch runs which may have been delayed differently for some uninteresting reason.

It will be understood that the batch display applications and the batch execution engines, the BOIs, CMOIs and the campaign manager server applications described herein can be used and implemented within any desired process plant control programming environment, and may be used in any process plant control system using any desired type of process plant control communication protocol and, further, may be used to perform any type of function with respect to any type of device(s) or sub-units of device(s). While the batch routines as described herein are preferably implemented in software stored in, for example, a server, a workstation or other computer, these routines may alternatively or additionally be implemented in hardware, firmware, application specific integrated circuits, programmable logic circuits, etc., as desired. If implemented in software, the batch routines may be stored in any computer readable memory such as on a magnetic disk, a laser disk, or other storage medium, in a RAM or ROM of a computer, controller, field device, etc. Likewise, this software may be delivered to a user or a device via any known or desired delivery method including, for example, over a communication channel such as a telephone line, the Internet, on a transportable medium, such as a computer-readable disk, etc.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A method for displaying batch data associated with one or more batch runs of a batch process, comprising:
    collecting multiple types of batch data associated with the one or more batch runs of the batch process from process equipment within the process plant; and
    generating a batch display showing a batch view illustrating the multiple types of batch data associated with the one or more batch runs of the batch process, the batch view including a time scale and a multiplicity of batch data layers disposed in relation to the time scale illustrating the times at which different events occurred within the one or more batch runs of the batch process,
    wherein each of the multiplicity of batch data layers comprises a base layer indicating total duration and start and end times, and
    wherein, for each batch data layer, the batch view includes multiple different types of icons associated with different types of the different events, each type of icon having a different shape and each icon indicating on the base layer a corresponding time of an event associated with the icon.

2. The method of claim 1, wherein collecting multiple types of batch data includes collecting batch procedure element data and process event data, and wherein generating the batch display includes showing the batch view with batch procedure element data in a first one of the multiplicity of batch data layers and with process event data in a second one of the multiplicity of batch data layers.

3. The method of claim 2, wherein collecting batch procedure element data includes collecting batch procedure element data related to multiple different batch procedure elements and wherein generating the batch display includes showing the batch view with the batch procedure element data related to multiple different batch procedure elements in the first one of the multiplicity of batch data layers.

4. The method of claim 3, wherein collecting batch procedure element data related to multiple different batch procedure elements includes collecting batch procedure element data related to batch events associated with multiple different batch procedure elements at different hierarchical levels, and wherein generating the batch display includes showing the batch view with the batch events associated with the multiple different batch procedure elements at different hierarchical levels in the first one of the multiplicity of batch data layers.

5. The method of claim 1, further including generating a batch signature including one or more statistical measures related to the timing of one or more of the different events illustrated in the batch view, wherein said one or more statistical measures are determined from a plurality of batch runs of the batch process.

6. The method of claim 5, furthering including displaying the batch signature in timed relation to one or more of the batch data layers of the batch view.

7. The method of claim 6, further including providing an indication of when one of the different events within the batch view falls outside of the statistical measure associated with the one of the different events within the batch signature.

8. The method of claim 7, wherein providing an indication includes generating an alarm signal when the one of the different events within the batch view falls outside of the statistical measure associated with the one of the different events within the batch signature.

9. The method of claim 7, wherein the one or more statistical measures related to the timing of the one or more of the different events includes an expected time or an expected deviation from an expected time for the one or more of the different events.

10. A method for displaying batch data associated with one or more batch runs of a batch process, comprising:
    collecting multiple types of batch data associated with the one or more batch runs of the batch process from process equipment within the process plant;
    generating a batch display showing a batch view illustrating the multiple types of batch data associated with the one or more batch runs of the batch process, the batch view including a time scale and a multiplicity of batch data layers disposed in relation to the time scale illustrating the times at which different events occurred within the one or more batch runs of the batch process; and
    generating a batch signature including one or more statistical measures related to the timing of one or more of the different events illustrated in the batch view,
    wherein said one or more statistical measures are determined from a plurality of batch runs of the batch process,
    wherein each of the multiplicity of batch data layers comprises a base layer indicating total duration and start and end times, and
    wherein, for each batch data layer, the batch view includes multiple different types of icons associated with different types of the different events, each icon indicating on the base layer a corresponding time of an event associated with the icon.

11. The method of claim 10, furthering including displaying the batch signature in timed relation to one or more of the batch data layers of the batch view.

12. The method of claim 11, further including providing an indication of when one of the different events within the batch view falls outside of the statistical measure associated with the one of the different events within the batch signature.

13. The method of claim 12, wherein providing an indication includes generating an alarm signal when the one of the different events within the batch view falls outside of the statistical measure associated with the one of the different events within the batch signature.

14. The method of claim 12, wherein the one or more statistical measures related to the timing of the one or more of the different events includes an expected time or an expected deviation from an expected time for the one or more of the different events.

* * * * *